(12) United States Patent
Osborne et al.

(10) Patent No.: US 6,298,676 B1
(45) Date of Patent: Oct. 9, 2001

(54) ICE THERMAL STORAGE CONTROL

(75) Inventors: William T. Osborne, Davidson; Gary D. Smith, Abingdon, both of MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/603,400

(22) Filed: Jun. 26, 2000

(51) Int. Cl.⁷ ....................................................... F25D 3/00
(52) U.S. Cl. ............................................... 62/139; 62/59
(58) Field of Search .......................................... 62/59, 139

(56) References Cited

U.S. PATENT DOCUMENTS

| | | | |
|---|---|---|---|
| 5,063,748 | * 11/1991 | Davis et al. | 62/59 |
| 5,649,431 | * 7/1997 | Schroeder, Jr. | 62/59 |
| 6,079,481 | * 6/2000 | Lowenstein et al. | 62/59 |
| 6,101,821 | * 8/2000 | Cates | 62/59 |
| 6,158,499 | * 12/2000 | Rhodes et al. | 62/59 |
| 6,216,486 | * 4/2001 | Aron et al. | 62/59 |

\* cited by examiner

Primary Examiner—William E. Tapolcai
Assistant Examiner—Mohammad M. Ali
(74) Attorney, Agent, or Firm—Edward J. Brosius (57) ABSTRACT

An arrangement of apparatus for the measurement of the quantity amount of ice in an ice thermal storage system having a storage tank with a storage fluid and a cooling coil assembly therein, and the method for measuring such ice quantity, which apparatus includes a means to provide an uplift force to the coil assembly and, means for measurement of the vertical displacement of the coil in the storage tank and means for relating the vertical displacement of the cooling coil assembly to the quantity of ice on the cooling coil assembly, and further noting a specific uplifting force assembly for use in such storage tanks.

12 Claims, 7 Drawing Sheets

ICE THERMAL STORAGE CONTROL

BACKGROUND OF THE INVENTION

The present invention relates to ice thermal storage systems and more particularly teaches an improved method and apparatus for measuring the amount of ice present on an ice thermal storage heat exchanger, such as a tubular coil assembly.

Ice thermal storage equipment of the type which forms ice during off peak energy periods and then makes the ice available as a supply of cold or low temperature fluid for space conditioning, and the like, is known in the art. The ice thermal storage equipment may be broadly classified as internal melt systems and external melt systems. One form of thermal storage equipment and external melt system transfers a coolant liquid, such as brine or ethylene glycol solution, through a coil assembly immersed in a tank of storage liquid to be frozen, which liquid may for example be water. The coil assembly is usually a serpentine configuration of bent tubing with multiple tube runs nested in the tank and storage liquid. Multiple coil assemblies are usually packed in parallel within the tank. The coil assemblies are connected between inlet and outlet headers for receipt and discharge of the coolant liquid from and to one or more heat exchangers or chillers, which cool the coolant fluid during the ice production cycle. Although the use of the coolant liquid has been noted as a brine solution, it is noted that the coolant liquid could be a refrigerant, such as R-22 or ammonia.

During the ice-production cycle, coolant liquid, such as brine, at a temperature below the solidification point of the storage liquid within the pool is continuously produced by mechanical refrigeration or other means in a heat exchanger, sometimes referred to as a chiller. The low-temperature coolant is transferred to an inlet header, through the coil assemblies and discharged from the outlet header for return to the chiller. The storage liquid in the tank is frozen on the tube outer walls in the form of surrounding envelopes and gradually develops as a substantial thickness of frozen liquid, usually ice. There is a volume of the storage liquid in the tank, which remains as a liquid. During recovery of the stored thermal energy, the chilled storage liquid is withdrawn from the tank and communicated to a downstream cooling coil or heat exchanger for use in cooling operations, such as air conditioning or food processing. Thereafter, the spent or warmed storage liquid is returned to the tank to be cooled and further used for cooling operations.

Efforts have been made to measure or quantify the degree of freezing of the liquid in the tank. The underlying reasons for the desire to quantify the frozen liquid is to know the amount of stored cooling capacity that exists in the tank. One method of ice build up measurement positions a coil on springs and employs load cells to sense the uplifting force of the coils, which are restrained from vertical movement. The intent of this apparatus is to relate the uplifting force to the quantity of ice on the coil. The precise structure and schematic drawings are not available in a published format for this load cell system.

Current means used to measure or monitor the ice build up on the coil assemblies in the tank liquid pool have included visual inspection of the ice at the surface, which is not considered to be efficient or measurable. Another ice-measurement method uses a fluid level monitor, which operates on the principle that a pound of ice occupies more volume than a pound of water. These devices are not relied upon in cases where the hydraulic system is not a closed loop. In addition, ice thickness measurements are provided in an external-melt system by utilization of electronic probes noting the change in conductivity on the tubes as the ice develops. However, the probes used in this method have proven to be fragile.

SUMMARY OF THE INVENTION

The present invention provides a method for identifying the amount of ice build up in a storage tank and thus, the available cooling capacity, and apparatus for measuring the ice build up in a pool of liquid by means providing an uplifting force and a displacement sensing arrangement. More specifically, it is desired to measure the mass of ice formed in liquid pool of an ice-thermal storage system. The mass of ice is measured as a function of the vertical movement of the surface of the coil assembly. The vertical movement may be measured electronically or manually.

The ice mass measurement allows the ice-forming or chilling cycle to be stopped at the one hundred percent of the design or any desired ice mass in the tank, which enhances the cooling operation of the thermal storage system.

BRIEF DESCRIPTION OF THE DRAWING

In the several figures of the drawing, like reference numerals identify like components, and in those drawings.

DETAILED DESCRIPTION OF THE PREFERRED EMBODIMENT

Figure 10:
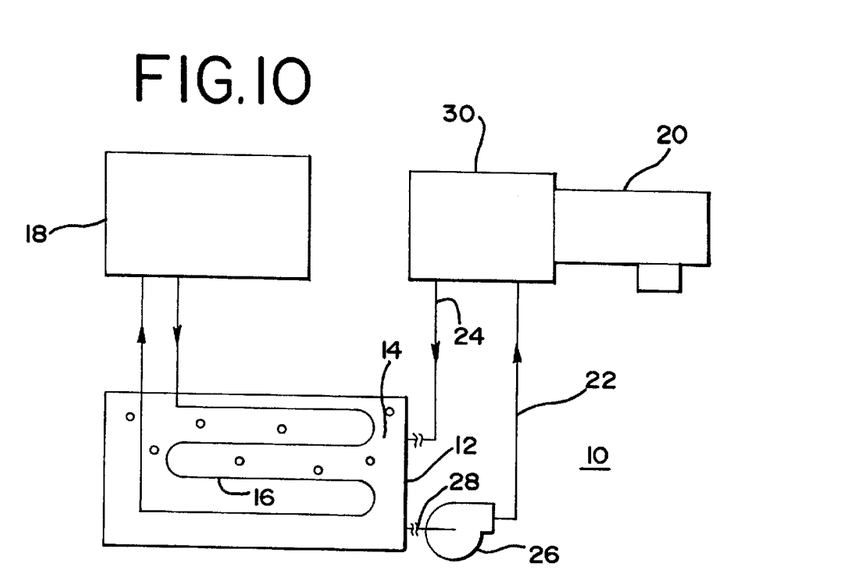
FIG. 10 is a schematic outline of an exemplary ice thermal storage unit; and, FIG. 11 graphically illustrates the percentage of ice in the storage tank as a function of the vertical coil movement in inches.

A basic or exemplary thermal storage unit 10 is shown in FIG. 10 with chamber 14 of storage tank 12 filled with a storage fluid, such as water. A coil arrangement 16 is nested in chamber 14 and is coupled to a glycol chiller or direct refrigerant system 18. In an external melt system a chilled coolant fluid, such as ethylene glycol, is communicated through coils 16 for chilling and freezing the storage fluid in chamber 14. Ice water pump 26 is connected to pool 14 by conduit 28 for communication of the chilled storage fluid in chamber 14 to a cooling coil 30 through conduit 22 for utilization of the stored cooling capacity for a low temperature air mixing terminal unit 20. The spent cooling fluid from cooling coil 30 is recirculated to chamber 14 through return conduit 24. Cooling coil 30 may be a heat exchange unit for an air conditioning unit, as an example. System 10 in FIG. 10 is merely an exemplary illustration of the use and operation of a thermal storage unit.

Figure 1:
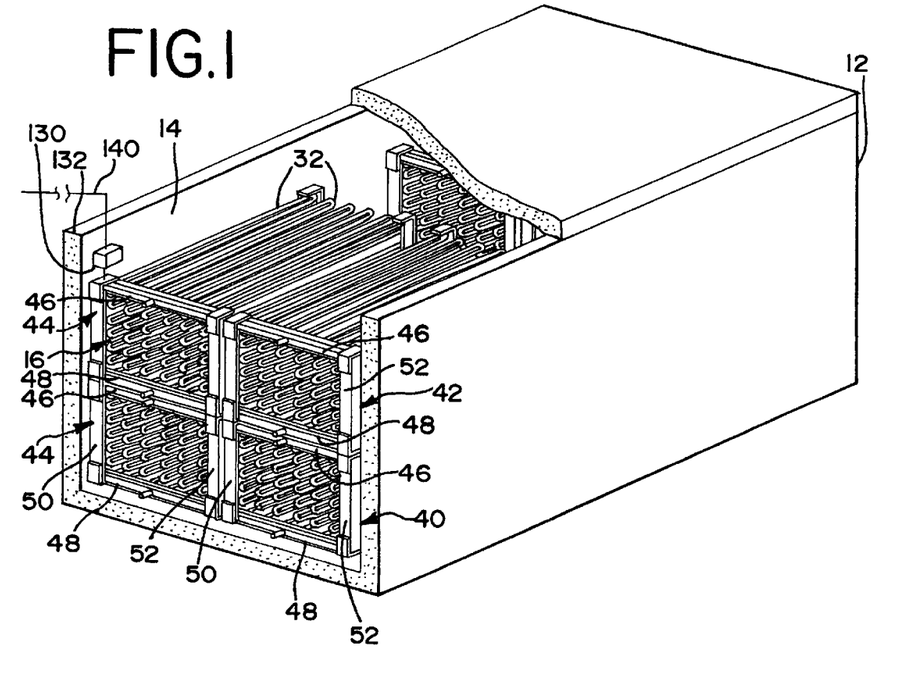
FIG. 1 is an oblique view in partial section illustrating an exemplary prior art coil assembly in a thermal storage tank.
Figure 2:
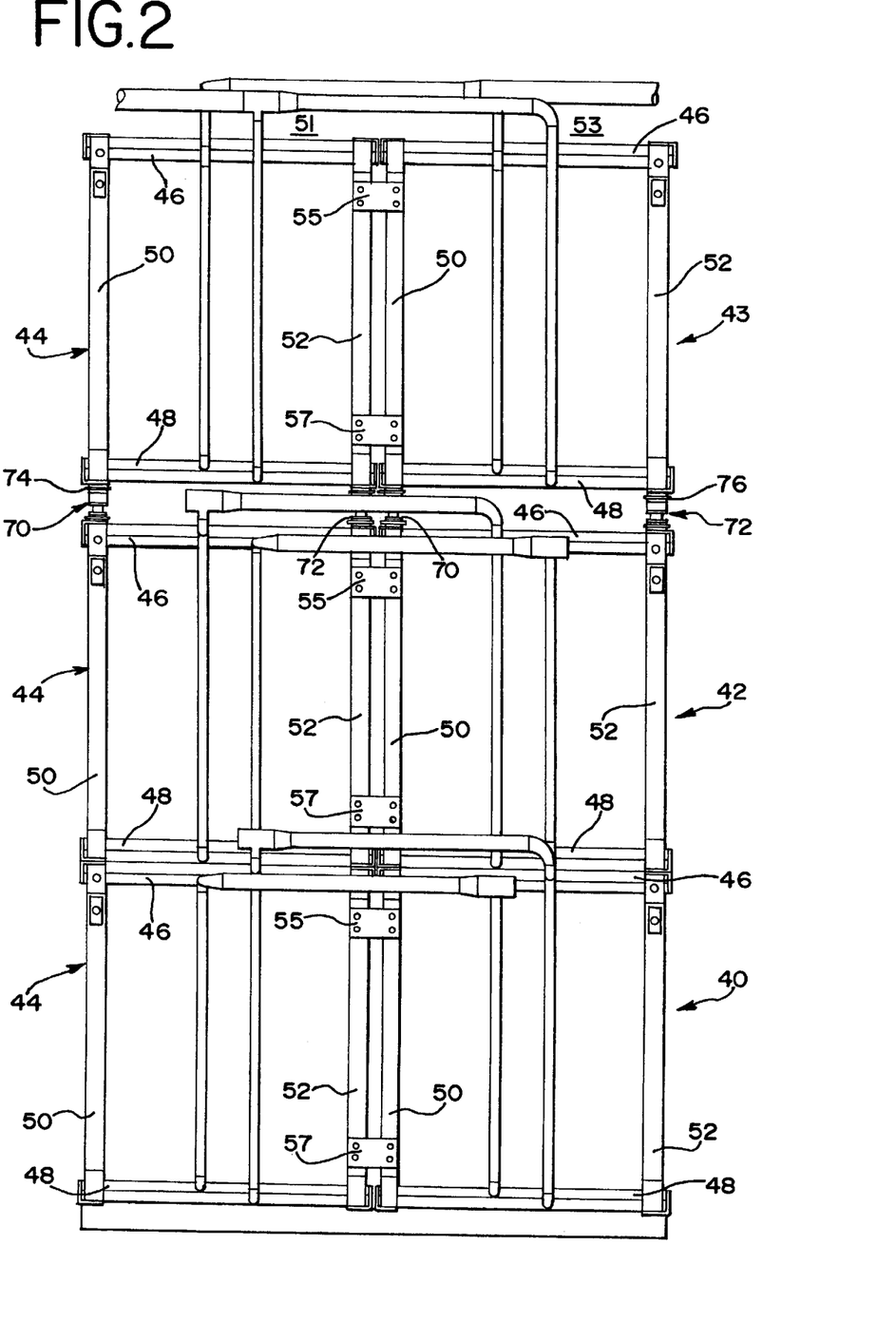
FIG. 2 is an end view of stacked coil assemblies and their headers with the spring assembly interposed between the top two coil assemblies.

Coil arrangement 16 in FIG. 10 is noted as a single serpentine coil or flow path in chamber 14 with wide vertical gaps between the adjacent horizontal runs of the coil. However, exemplary tubes 32 of a typical coil arrangement 16, as shown in FIGS. 1 and 2, have a more usual arrangement of a tight array of tubes 32 extending between headers 46 and 48. Coil arrangements 16 are generally designed with an ice mass or volume that is considered to be a design or desired ice buildup.

In FIG. 1, each vertical coil arrangement 16 has lower tube bundle 40 and upper tube bundle 42, although it is known that the number of vertical tube bundles may be greater than two. Tube bundles 40 and 42 in FIG. 1 are each nested in coil frame arrangement 44 with upper coil header 46, lower coil header 48, and, vertical framing members 50 and 52 as noted. The noted framing with headers 46 and 48, and vertical framing members 50 and 52 provides structure to the ordered array of tube bundles within chamber 14 of tank 12. Tube spacers, not shown but known in the art, are positioned between the adjacent tubes 32 within each bundle to maintain the horizontal and vertical location of tubes 32 within tube bundles 40 and 42.

Coil stacks 51 and 53 in FIG. 2 each have three tube bundles 40, 42 and 43 vertically stacked. More specifically, each pair of tube bundles 40, 42 and 43 of coil stacks 51 and 53 is coupled by splice plates 55 and 57. Each tube bundle has first vertical support 50 and second vertical support 52 as well as upper coil header 46 and lower coil header 48 horizontally extending between first and second vertical supports 50 and 52. In this illustration, spring assembly 70 is shown at an outer corner of tube bundle 43 of first coil stack 51 and second spring assembly 72 is noted at the outer corner of tube bundle 43 of second coil stack 53, which spring assemblies 70 and 72 are nested on corners or corner brackets of respective vertical supports 50 and 52. Spring assemblies 70 and 72 provide a force directing tube bundles 43 vertically upward, which tube bundles are free to move vertically at least at one end of tube bundle 43.

Figure 4:
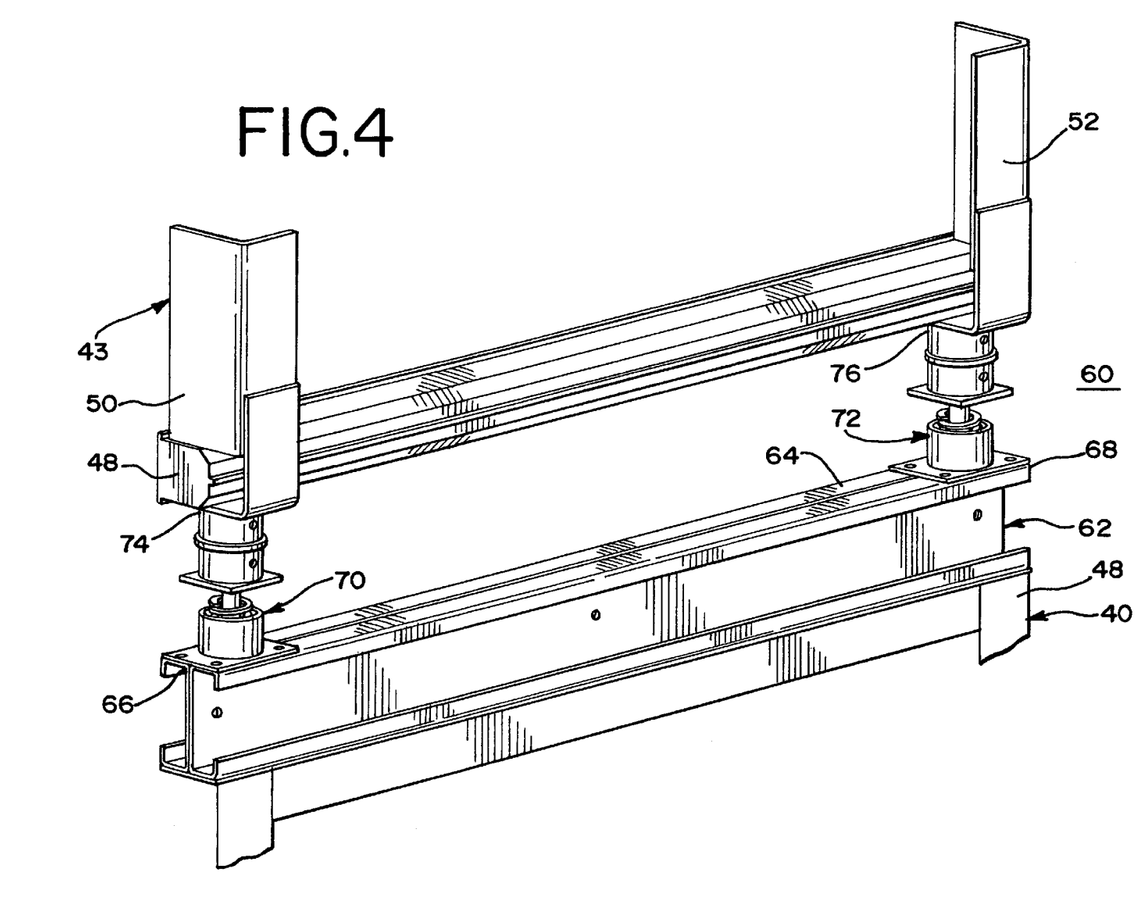
FIG. 4 is an enlarged view of the placement of the spring assemblies on a support channel for the ice coils in the storage tank.

The arrangement of spring assemblies 70 and 72 are more clearly illustrated in FIG. 4 with spring and channel arrangement 60. In this figure, channel or I-beam 62 may be provided as a support for spring assemblies 70 and 72, which channel 62 has upper surface 64, a first end 66 and a second end 68. A first spring assembly 70 is positioned on upper surface 64 at first end 66 and a second spring assembly 72 is positioned on upper surface 64 at second end 68. The corner bracket or lower edge of vertical frame member 50 or 52 of tube bundle 43 is positioned on the respective upper ends 74 and 76 of spring assemblies 70 and 72. Channel 62 is provided in this figure as support for springs 70 and 72. Within the context of FIG. 2, this arrangement could be provided for support at the base of coil stacks 51 and 53, which might be the bottom of tank chamber 14 in an alternative arrangement. It is thus apparent that the location of springs 70 and 72 may be located to support any number of the tube bundles in a coil stack arrangement having vertical freedom above such springs.

Figure 5:
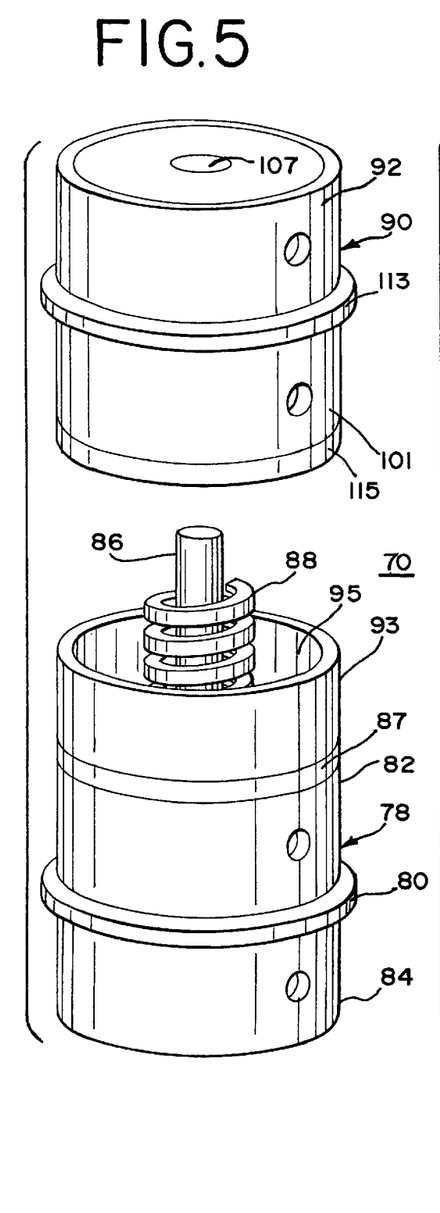
FIG. 5 illustrates a partially exploded elevational view of the housing for a coil spring assembly.
Figure 6:
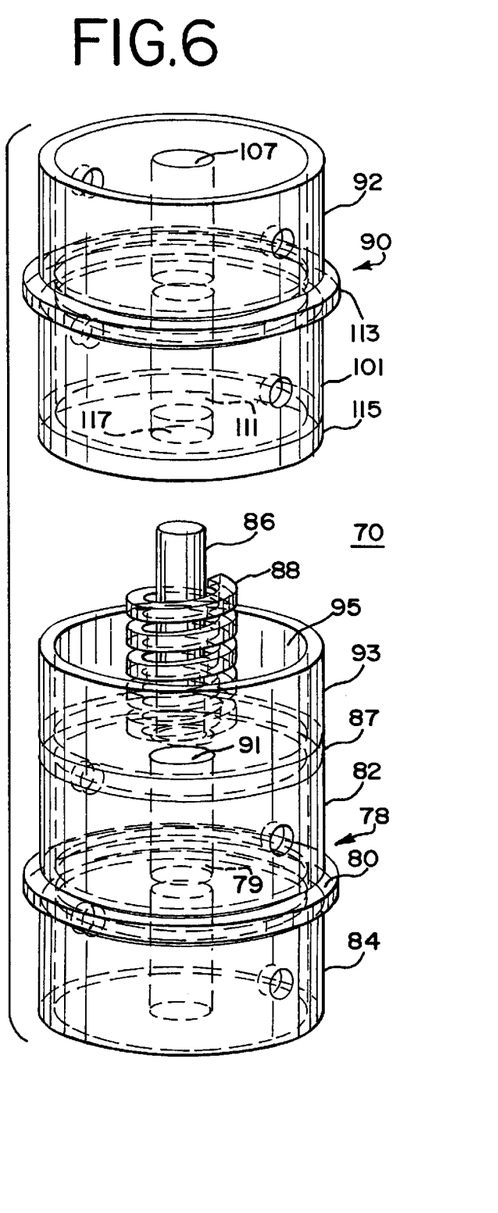
FIG. 6 is a phantom outline illustration of the elevational view in FIG. 5.
Figure 7:
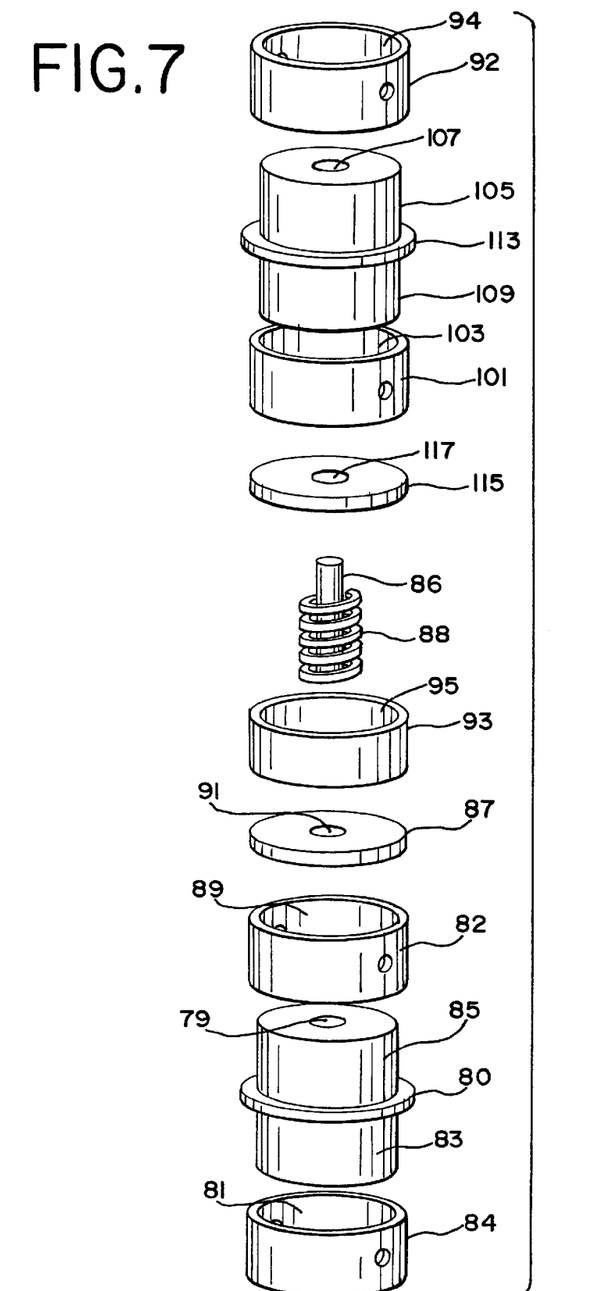
FIG. 7 is an exploded view of the coil spring assembly in FIG. 5.

The specific structure of spring assemblies 70 and 72 is illustrated in FIGS. 5, 6 and 7, which shows spring assembly 70 in exploded views. As spring assemblies 70 and 72 are similar only spring assembly 70 will be described but the description will be applicable to spring assembly 72. Spring assembly 70 is a stacked arrangement of components. Lower housing 78 has first metal pipe segment 84 with passage 81, and second metal pipe segment 82 with passage 89, an insulator collar 80 between insulator cores 83 and 85. Insulator core 83 mates with passage 81 and second insulator core 85 mates with passage 89 to capture collar 80 between upper housing segment 82 and lower housing segment 84. Annular disc 87 with aperture 91 is positioned between third housing segment 93 with passage 95 and second housing segment 82. Second insulator core 85 has aperture 79 alignable with disc aperture 91. Coil spring 88 is positioned about rod 86 and extends to passage 95 in lower housing 78. Upper housing 90 has upper pipe segment 92 with passage 94 and lower pipe segment 101 with passage 103. Insulator core 105 has passage 107, second upper insulator core 109 has passage 111, and second insulator collar 113 is positioned between insulator cores 105 and 109. Insulator core 105 is mated into passage 94 of pipe segment 92 and lower insulator core 109 is mated with passage 103 of lower pipe segment 101 with collar 113 secured between segments 92 and 101. Second annular disc 115 has aperture 117 alignable with insulator core aperture 111 and mates with rod 86. Annular disc 115 is secured to the bottom of housing segment 101 for bearing against spring 88 with rod 86 movable in the aligned apertures 111, 117 and 107. In this illustrated arrangement of spring 70, lower housing 78 and upper housing 90 are shown as generally cylindrical with round cross-sections, but housing shape is not a limitation.

Figure 8:
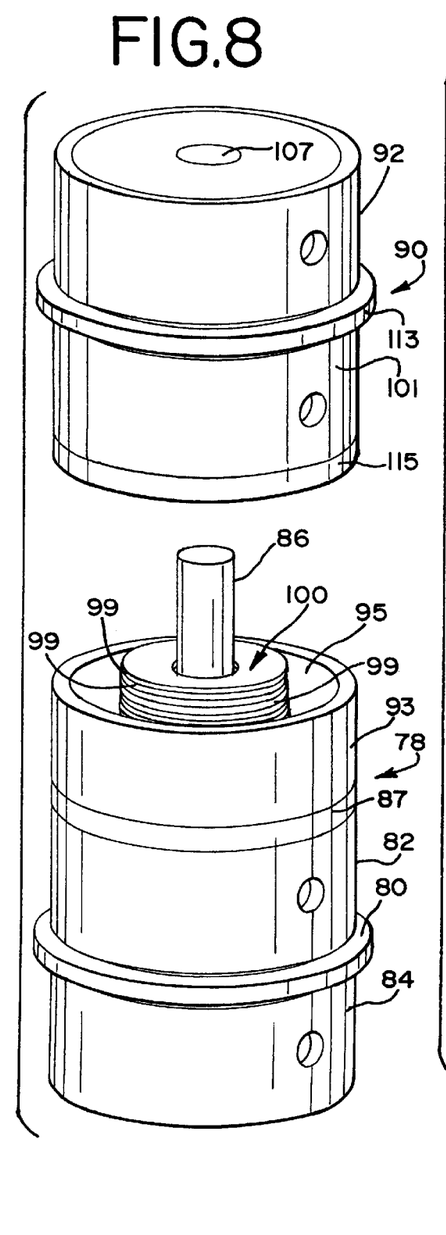
FIG. 8 is a partially exploded view of the spring assembly of FIG. 5 with Belleville washers.
Figure 9:
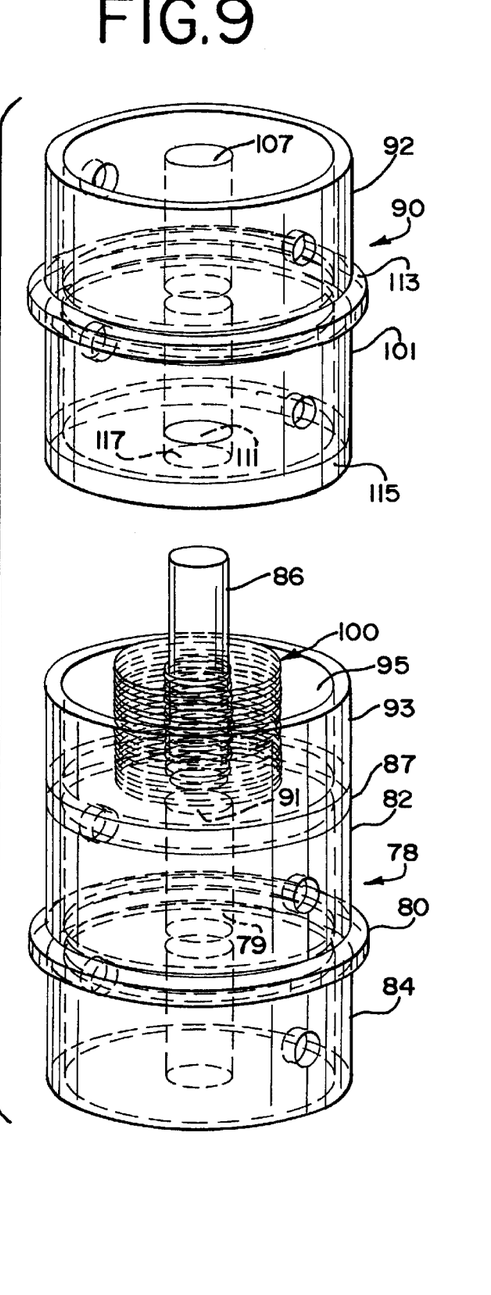
FIG. 9 is a phantom outline illustration of the elevational view in FIG. 8.

An alternative spring arrangement 100 is illustrated in FIGS. 8 and 9 within upper housing 90 and lower housing 78 of spring assembly 70. In this arrangement, a plurality of Belleville washers are stacked on rod 86 in passage 95 to provide the uplifting force against disc 115 and upper housing segment 90 similar to the uplifting force of coil spring 88. Other uplifting means may provide the uplifting force to be applied to the tube bundles of coil assembly 16, such as pneumatic, hydraulic or elastomeric apparatus.

In FIG. 1, sensor 130 is noted as mounted at upper edge 132 of tank 12. Sensor 130 is utilized to note the upward movement of coil assembly 42 as ice is developed on tube 32. The upward movement is the result of a balance of forces from at least the following force components: (1) the weight of coil assembly 16 above spring assemblies 70 and 72, whether such coil assembly is one or more tube bundles; (2) the weight of the cooling fluid in tubes 32 of the coil assembly above spring assemblies 70 and 72; (3) the upwardly directed force from spring assemblies 70 and 72; (4) the weight of the ice formed on tubes 32 of the coil assembly 16 above spring assemblies 70 and 72; and, (5) the buoyant force from the ice formed on tubes 32 of coil assembly 16. It is recognized that these forces will be dependent upon the storage fluid in chamber 14 continuously covering coil assembly 16, and that these resultant forces will vary with the mass of fluid in the tubes 32 and the amount of ice formed on tubes 32. The tube bundle, or bundles, 40, 42 and 43 above spring assemblies 70 and 72 must be free to move vertically. Typically this may be accommodated by various means including flexible connections at headers 46 and 48, or by measurement at a single end of the tube bundle under consideration.

Sensor 130 is not an active element in thermal storage unit 10, but merely monitors the upward shift or displacement of coil assembly 16, which is translated into a percentage of ice growth in tank 12. The specific type of sensor 130 is a design choice, but an example of such a sensor is a displacement transducer Series 240 from Trans-Tek Incorporated. Further, the upward displacement may be measured manually for conversion to a percentage of ice buildup in chamber 14 by such means as a nomograph, a chart, or a graphical illustration.

Figure 11:
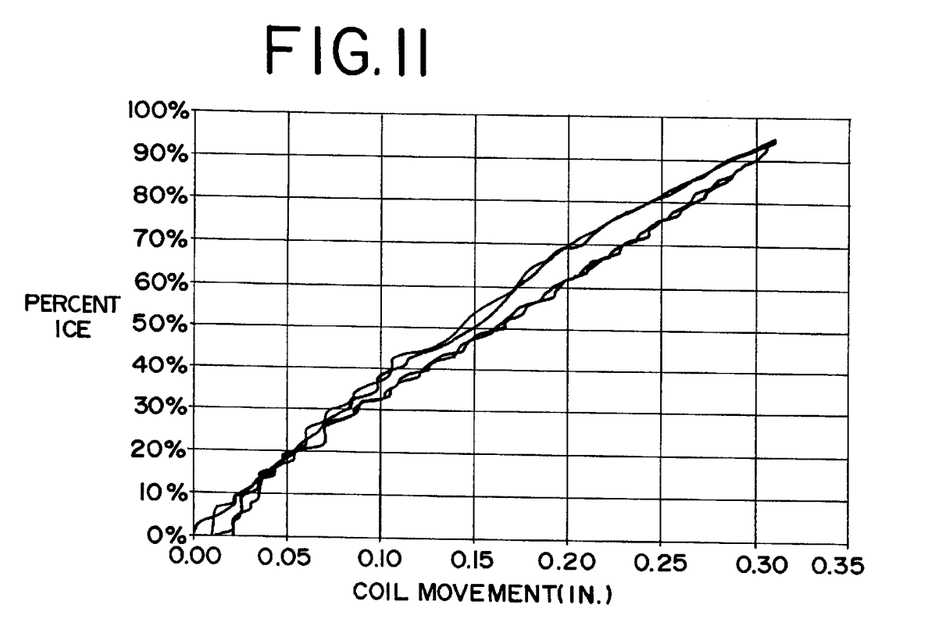

An example of such graphical conversion chart is noted in FIG. 11 where the percentage of ice growth, as compared to the full design capacity, is noted as a function of the displacement of coil assembly 16. The correlative nature between vertical movement of coil assembly 16 and the growth of ice as a percentage of theoretical or design ice capacity is noted in FIG. 11. In this graphical display, movement of coil assembly 16 up to 0.35 inch from a zero or reference position is correlated to the expected rate of growth of ice per inch of coil assembly rise. In this case, the change in position of the free-floating coil assembly 16 from its reference or as-assembled position is being monitored by sensor 130. The specific amount of change in coil position for each coil design and tank structure may vary but can be calibrated. The change in vertical position of coil assembly is a reflection of the buoyancy associated with the quantity of the ice growth from the storage liquid in chamber 14.

In the operation of the exemplary external melt system of FIG. 10, thermal storage system 10 has an ice buildup cycle and an ice melt cycle for recovery of the stored thermal energy. As noted above, an external melt cycle chilled fluid from chamber 14 would be transferred by pump 26 to a downstream cooling coil 30 and thereafter returned to chamber 14 for reuse. During the ice buildup cycle there is a buoyancy effect upon coil assembly 16 as the density of the ice is less than the density of the water. This buoyancy effect acts in combination with the springs to produce vertical movement of the coil assembly 16.

In the present case, a single coil assembly 16, and more specifically tube bundle or bundles 40, 42 and 43, is constrained against horizontal movement, but rests on calibrated spring assemblies 70, 72 allowing it to move vertically. In FIG. 1, the vertical movement is monitored by a calibrated transducer 130, which communicates an output signal over a line 140 to a signal receiver, such as central processing unit, CPU, 142 in FIG. 3. CPU 142 is operable to receive the signal from transducer 130 and compare it to empirical data indicative of the percentage of ice buildup in tank 12. Further, CPU 142 may provide an output signal to a controller 144 over line 146, which may provide direct control to refrigeration system 18 over line 150 to initiate ice buildup or shut down refrigeration system 18 after the desired ice buildup in tank 12. In this exemplary control arrangement, it is considered that the empirical data for the control cycle is available and provided to control device 142, which data may be calculated or experimental.

Figure 3:
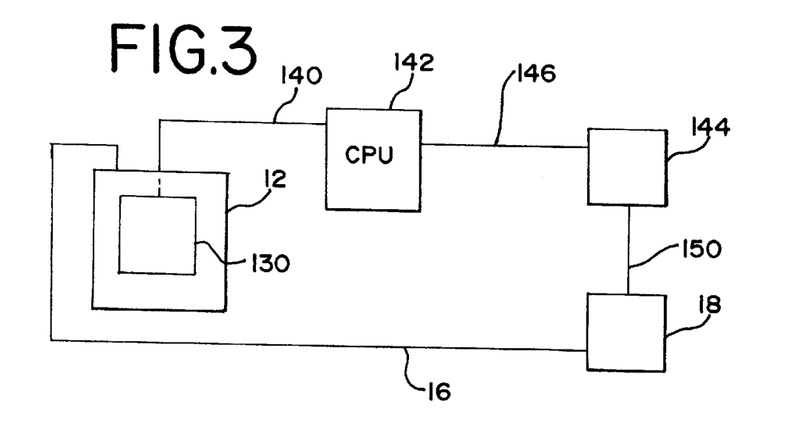
FIG. 3 is an exemplary schematic of a control circuit for the ice thermal storage system.

The style of spring assembly 70 and 72 may utilize coil springs as shown in FIGS. 5, 6 and 7, or Belleville washers as shown in FIGS. 8 and 9, but the output signals for CPU 142 will require calibration for the style of spring assembly, the specific transducer assembly 130 and the amount of expected displacement of coil assembly 16. The specific signal receiver and control circuit can be varied to accommodate available equipment, and the circuit of FIG. 3 is merely exemplary and not a limitation. Alternatively, the amount of vertical displacement may be measured manually and the relationship to the amount of ice buildup in chamber 14 may be directly compared to empirical data and read from a nomogram, chart or graph.

While only specific embodiments of the invention have been described and shown, it is apparent that various alterations and modifications can be made therein. It is, therefore, the intention in the appended claims to cover all such modifications and alterations as may fall with the scope and spirit of the invention.

We claim:

1. An assembly for the measurement of the amount of formed ice in a thermal storage apparatus, said apparatus having means for holding a storage liquid, a freezable storage liquid in said holding means, means for freezing said storage liquid in said holding means and on said freezing, means, said freezing means vertically movable, said measurement assembly comprising:

means for providing an uplifting force to said means for freezing, said means for freezing having a top and a bottom, said uplifting force means positioned at said freezing-means bottom to provide said uplifting force tending to vertically move said freezing means;

said frozen storage liquid on said freezing means providing a buoyant force to said freezing means;

means for measuring vertical displacement of said freezing means in said holding means; and, means for noting the amount of ice in said holding means relative to said displacement of said freezing means, and noting the amount of said ice in said holding means as one of a percentage of a design capacity and a quantity of said frozen storage liquid.

2. An assembly for the measurement of the amount of formed ice in a thermal storage apparatus as claimed in claim 1 wherein said freezing means is a coil assembly having a top and a bottom, said uplifting force means positioned at said coil assembly bottom to provide said uplifting force to vertically move said freezing means.

3. An assembly for the measurement of the amount of formed ice in a thermal storage apparatus as claimed in claim 1 wherein said uplifting force means is at least one spring assembly to provide said uplifting force.

4. An assembly for the measurement of the amount of formed ice in a thermal storage apparatus as claimed in claim 3 wherein said spring assembly has at least one coil spring to provide said uplifting force.

5. An assembly for the measurement of the amount of formed ice in a thermal storage apparatus as claimed in claim 3 wherein said spring assembly has at least one Belleville washer to provide said uplifting force.

6. An assembly for the measurement of the amount of formed ice in a thermal storage apparatus as claimed in claim 1 wherein said means for measuring vertical displacement of said freezing means is a transducer assembly.

7. An assembly for the measurement of the amount of formed ice in a thermal storage apparatus as claimed in claim 6 wherein said transducer assembly provides a signal, said means for measuring further comprising means for receiving, a signal and, means for communication, said communication means coupling said transducer assembly and said signal receiving means, means for illustrating an output signal, said communication means coupling said signal receiving means to said signal receiving means, said signal receiving means operable to provide an output signal to said means for illustrating said amount of ice buildup in said holding means as a function of said transducer signal and freezing means vertical displacement.

8. An assembly for the measurement of the amount of formed ice in a thermal storage apparatus as claimed in claim 1 wherein said means for measuring vertical displacement of said freezing means is a manual device to measure the vertical displacement of said means for freezing.

9. An assembly for the measurement of the amount of formed ice in a thermal storage apparatus as claimed in claim 1 further comprising means for chilling, a chilling fluid and means for conducting, said chilling means operable to reduce the temperature of said cooling fluid to a desired temperature, said means for freezing is a coil assembly, said coil assembly coupled to said means for chilling by said conducting means for communication of said chilling fluid to said coil assembly, said coil assembly having at least one tube bundle having a plurality of circuits for the communication of said cooling fluid, said cooling fluid transferred to said tube bundle to freeze said storage fluid in said holding means.

10. An assembly for the measurement of the amount of formed ice in a thermal storage apparatus as claimed in claim 9 wherein said coil assembly has a plurality of tubular bundles, each said bundle having a top and a bottom, said tube bundles of said coil assembly vertically arranged, said uplifting force means provided at the bottom of one of said tube bundles, said tube bundles above said uplifting force means vertically movable for displacement during ice buildup in said holding means.

11. An assembly for the measurement of the amount of formed ice in a thermal storage apparatus as claimed in claim 10 wherein said means for holding has a base, said uplifting force means positioned at said holding means base, and said coil assembly above said uplifting force means being vertically movable during ice buildup in said holding means and on said coil assembly.

12. A method for measuring the ice build up in an ice thermal storage unit having a holding tank, a storage fluid in said holding tank, a coil assembly with a top and a bottom in said storage fluid for freezing said storage fluid, a cooling fluid, a system for chilling said cooling fluid, conduit coupling said chilling system to said coil assembly for communication of said cooling fluid to said coil assembly and said tank for freezing the storage fluid in said tank, said method comprising:

providing said coil assembly to be vertically movable;

providing means for providing an uplifting force, positioning said uplifting force means at said coil-assembly bottom tending to vertically move said coil assembly;

providing means for sensing displacement, said displacement sensing means measuring said vertical displacement of said coil assembly;

providing means for relating coil assembly vertical displacement to ice buildup in said tank; and, correlating said measured coil-assembly displacement to ice buildup in said tank to indicate the amount of ice buildup in said tank.

* * * * *